United States Patent Office 3,348,314
Patented Oct. 24, 1967

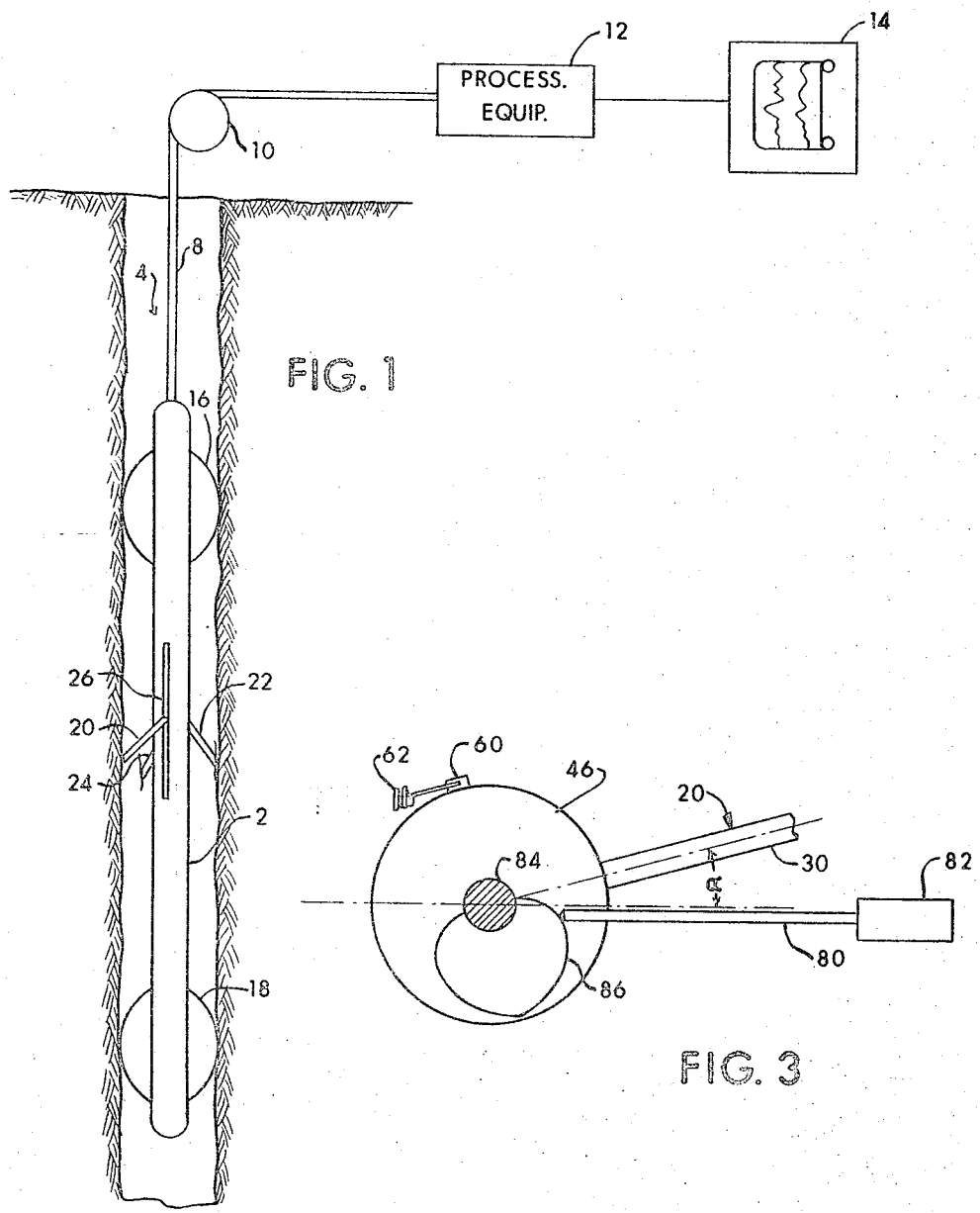

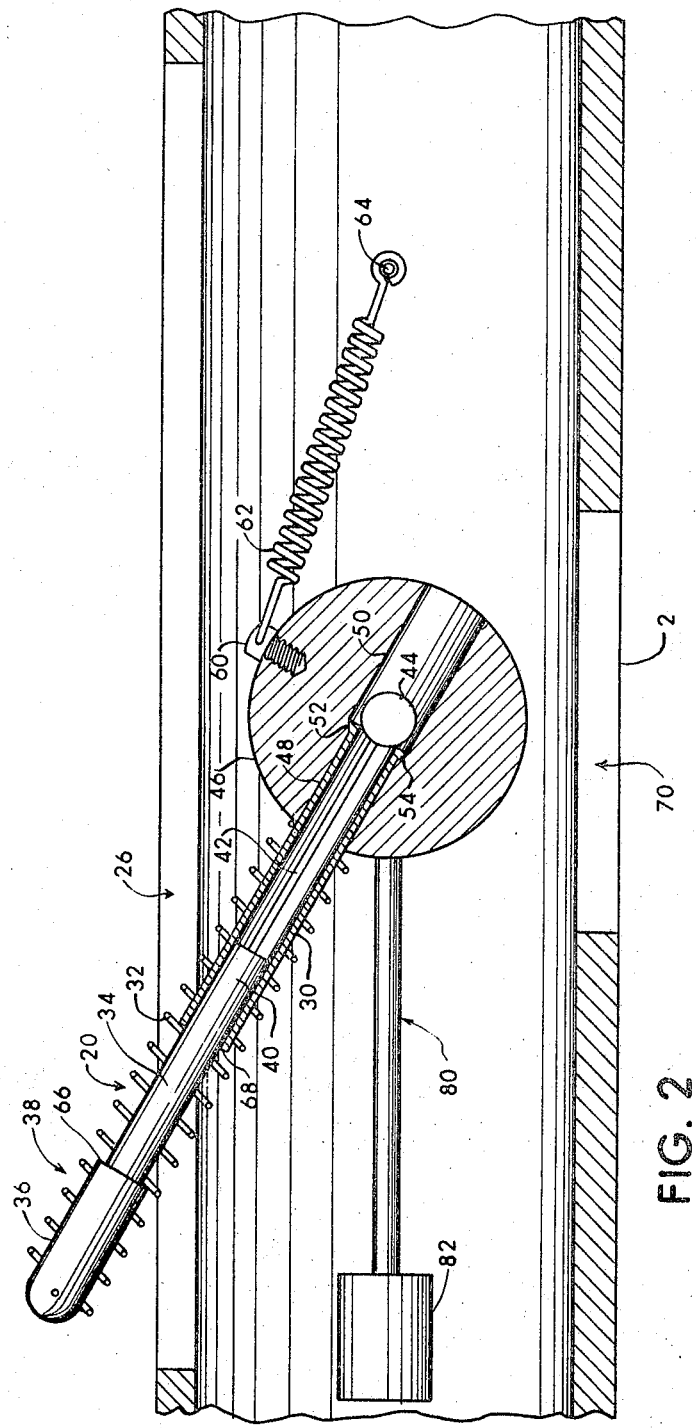

3,348,314
WELL BORE CALIPER
Alexis A. Venghiattis, Houston, Tex., assignor to Dresser Industries, Inc., Dallas, Tex., a corporation of Delaware
Filed May 27, 1965, Ser. No. 459,153
8 Claims. (Cl. 33—178)

This invention relates to well logging methods and apparatus, and more particularly relates to improved methods and apparatus for measuring the mean radius of an uncased oil or gas well.

It is now well known that oil and gas is found in subsurface earth formations, and that such oil and gas is brought to the surface through boreholes which are drilled into these petroleum-bearing earth formations. What is not so well known is that the oil and gas does not normally flow into the borehole the moment the formation is tapped. In fact, many formations that contain substantial quantities of oil and gas are often drilled completely through without giving any indication of the presence of their contents. Consequently, it is the usual practice to drill a well to a predetermined depth, and thereafter to log the well to survey the character of the earth substances along the length of the borehole.

Many different logging techniques are currently employed in the oil and gas industry to make these surveys. In most cases, however, they involve the use of an elongated well logging tool which is passed through the borehole by means of a cable. The instrument generates electrical signals indicative of one or more characteristics of the adjacent earth formations, and these signals are transmitted to surface processing and recording equipment by means of the cable. Thus, a chart is usually obtained which provides, in conjunction with correlative borehole depth indications, a continuous record or "log" of the borehole with respect to the characteristics sought to be measured.

Although most of the logging methods and systems now in use tend to provide useful measurements under most conditions, it should be realized that the logging instrument can only measure what it "sees," and that the equipment ordinarily is subject to borehole environmental conditions which may adversely affect the measurements. In particular, the cross sectional size and shape of the borehole often varies throughout the length of the borehole, and these variations in borehole size and shape will significantly affect most logging measurements without giving evidence of their existences.

Accordingly, it is presently common practice to make a caliper-like survey of the borehole, to provide a correlative record of the borehole radius along its entire length, and to thereby provide a basis for making this necessary adjustment in the logs of the subsurface earth materials. This caliper survey is generally obtained by means of one or more spring-loaded arms, which are urged against the borehole wall as the logging instrument is drawn to the surface, and which generate an electrical signal indicative of the relative position of the tips of one or more of these arms with respect to the axis of the instrument. Examples of such caliper apparatus may be found disclosed in U.S. Patent No. 2,649,786, which issued Aug. 25, 1953, to R. W. Goble; and in U.S. Patent No. 2,660,800, which issued Dec. 1, 1953, to B. F. Wiley.

As may be seen in these two patents, the typical caliper system has a plurality of arms (usually three) which are pivotally attached to the logging instrument so that they may be arcuately extended to press against the wall of the borehole. The arms do not move independently of each other, but instead move in conjunction with each other. Thus, the arms function to centralize the instrument in the borehole at all times.

It may also be seen in the aforementioned patents, that provision is made for holding the arms in a retracted position while the instrument is lowered into the borehole. Thereafter, the spring-loaded arms are released to move out against the borehole, and the instrument is drawn up through the borehole while the spring-loaded arms course along the borehole wall.

It will thus be seen that the caliper apparatus and methods now in use are subject to two primary disadvantages. First, they tend to provide radial measurements of the smallest inscribed circle at each point along the borehole, rather than measurements of the mean or average radius. Second, once the arms are released the instrument can only be moved upwardly in the borehole, and the instrument must be removed from the borehole in order for the arms to be returned to their retracted positions.

These disadvantages are overcome with the present invention and novel methods and apparatus are provided which develop a measurement of borehole radius which more accurately reflects the average radius of the borehole, and which permit the subsurface equipment to be moved either direction in the borehole.

Accordingly, it is an object of the present invention to provide novel methods and apparatus for measuring the average radius of a borehole in the earth.

It is also an object of the present invention to provide novel methods and apparatus for measuring the radius of a borehole at a plurality of points along said borehole.

It is further an object of the present invention to provide novel methods and apparatus for directly measuring the radius of a borehole in the earth.

It is a specific object of the present invention to provide a method of measuring the average radius of an uncased borehole in the earth, said method comprising the steps of establishing substantially the longitudinal axis of said borehole, separately and simultaneously establishing the perpendicular distances between said established longitudinal axis of said borehole and a plurality of location points on the wall of said borehole, and deriving the average of said distances.

It is also a specific object of the present invention to provide in a well logging system including a subsurface logging instrument, improved caliper apparatus comprising centralizing means for centering said instrument in a borehole, caliper means for simultaneously and separately deriving the perpendicular distances between the axis of said instrument and a plurality of points on the wall of said borehole, and electrical means for deriving the average of said distances between said points and said axis of said instrument.

These and other objects and features of the present invention will be apparent from the following detailed description, wherein reference is made to the accompanying drawings.

In the drawings:

FIG. 1 is a pictorial representation of a typical well logging system disposed in a borehole and incorporating one form of the present invention.

FIG. 2 is a pictorial representation of the details of the apparatus depicted generally in FIG. 1.

FIG. 3 is a different view of the apparatus depicted generally in FIG. 2.

As will hereinafter be apparent, the advantages of the present invention are preferably obtained with novel caliper apparatus incorporated in a centralized well logging instrument, which caliper apparatus includes three independently movable caliper arms radially disposed equidistantly about the instrument. Each caliper arm is pivotally mounted preferably at the axis of the instrument in a manner to be arcuately urged in a spring-loaded manner outwardly against the face or wall of the borehole. Furthermore, each arm is preferably formed in a telescopically, collapsible manner, and is also provided with cam means adapted to position a potentiometer in a manner directly related to the sine of the angle between the caliper arm and the axis of the instrument.

Referring now to FIG. 1, there may be seen a typical well logging system, including a subsurface instrument 2 disposed in a borehole 4 for measuring one or more lithological characteristics of the surrounding earth. The instrument 2 is suspended by a logging cable 8 passing over a measuring sheave wheel 10 and connecting to electronic processing equipment 12 and a recorder 14.

The sheave wheel 10 is also preferably connected to the recorder 14 by suitable means not depicted, to provide a correlative borehole depth measurement, and may be suspended over the mouth of the borehole 4 by any suitable means such as a traveling block supported by a derrick. The instrument 2 may be any kind of well logging tool, such as a radioactivity or acoustic well logging tool, which is preferably operated in a centralized position with respect to the borehole 4. Thus, as may be seen, the instrument 2 is preferably provided with centralizing means such as upper and lower bowsprings 16 and 18.

As may also be seen, the instrument 2 also preferably includes three caliper arms 20, 22 and 24, which are each independently movable with respect to the other, and which are pivotally mounted in the instrument 2 at a point or points along the longitudinal axis of the instrument 2. Each arm 20, 22, and 24 is also adapted to move arcuately through a 180 degree angle, as will hereinafter be apparent, and thus each arm 20, 22, and 24 preferably extends outwardly through a slot-like aperture 26 in the housing of the instrument 2 which is more than twice the length of the arm 20 which it accommodates.

Referring now to FIG. 2, there may be seen a more detailed representation of that section of the instrument 2 which encompasses one of the caliper arms 20, 22, or 24, wherein the arm 20 is comprised of a hollow tube 30 disposed within a coil spring 32 and containing a piston member 34 which may have a protective cap 36 on its outer end 38. As may be seen, the other end 40 of the piston member 34 which is slidably disposed inside the tube 30, is connected to a flexible cable 42 which, in turn, is secured to a metal ball 44.

There may also be seen a disc-like member, hereinafter referred to as a "hub" 46, which is preferably rotatably mounted at its circular center point at a point along the longitudinal axis of the instrument 2, and which is also provided with an aperture extending through it along its circular diameter. The aperture is composed of one smaller hole 48 which is of a size sufficient only to accommodate the tube 30, and which connects with a larger hole 50 which houses the metal ball 44. The tube 30 may be seen to have a flared end 52 which fits into the beveled enlargement 54 of the smaller hole 48. The coil spring 32 is fixedly secured to the cap 36 or outer end 38 of the piston member 34, and under compressive tension, pushes against the hub 46. Thus, the coil spring 32 tends to keep the piston member 34 urged outwardly of the tube 30 and hub 46, while the flexible cable 42 and metal ball 44 keeps the piston member 34 from being forced completely out of the tube 30.

There may also be seen an eye bolt 60 threadedly engaged with the rim of the hub 46 at a point about 90 degrees from the tube 30. Attached to the eye bolt 60 is another spring 62 which is secured to a pin 64 positioned preferably along the axis of the instrument 2 at a point spaced a suitable distance from the center of the hub 46. The spring 62 functions to rotatably urge the caliper arm 20 arcuately outward, through the slotted aperture 26 in the instrument 2 housing, so that the cap 36 is pressed against the wall of the borehole 4 as the instrument 2 moves in the direction of the pin 64, that is, in an upward direction as seen in FIGURE 2.

If it is desired to reverse the travel of the instrument 2 through the borehole 4, the cap 36 will tend to dig into the wall of the borehole 4. However, instead of simply lodging the instrument 2 immovably in the borehole 4 in the manner of conventional equipment, the pressure of the instrument 2 will force the piston member 34 into the tube 30 until the flange end 66 of the cap 36 pushes against the outer end 68 of the tube 30. Thereafter, as the arm 20 rotates completely towards the pin 64, the cap 36 will, if necessary because of the size of the borehole 4, even push the flared end 52 of the tube into the larger aperture 50 in the hub 46. Thus, when the arm 20 is at a 90-degree angle to the instrument 2, its total length will not exceed the sum of the lengths of the cap 36 and tube 30, and will then flip over towards the pin 44.

As the instrument 2 moves further in the direction relatively away from the pin 64, that is, downwardly as seen in FIGURE 2, the coil spring 32 will force the piston member 34 back out of the tube 30, until the metal ball 44 seats itself against the flared end 52 of the tube 30. The beveled shoulder 54 of the smaller aperture 48, of course, prevents the tube 30 from being pulled completely out of the hub 46 by the coil spring 32.

It should be noted that a second slotted aperture 70 is also preferably provided in the housing of the instrument 2, at a location immediately opposite the first slotted aperture 26. If the combined length of the cap 36 and the tube 30 is greater than the diameter of the instrument 2, then it will be impossible for the arm 20 to move to a 90 degree position (relative to the instrument 2) in small boreholes. Thus, the second slotted aperture 70 permits the tube 30 to extend out of the instrument 2, if necessary, and the arm 20 will thus move through a 180 degree angle in any borehole 4 having a diameter which is at least as great as the combined lengths of the cap 36 and tube 30 (assuming, of course, that the length of the portion of the piston member 34 not covered by the cap 36 is no greater than the length of the tube 30). It should also be noticed that the second slotted aperture 70 is thus substantially shorter than the length of the first slotted aperture 26, since it is not intended to accommodate the entire length of the arm 20.

When the instrument 2 progresses a sufficient distance in a direction away from pin 64, that is, downwardly as seen in FIGURE 2, the hub 46 will, of course, rotate past 90 degrees and the arm 20 will extend upwardly in the borehole 4. However, the spring 62 will continue to urge the arm 20 outwardly against the wall of the borehole 4, since the eye bolt 60 will have been rotated away from the pin 64 (though in an opposite direction) as the arm 20 moves through the 90 degree angle relative to the axis of the instrument 2. Accordingly, it may be seen that the instrument 2 may be moved freely up and down in the borehole 4 as desired.

Referring now to FIG. 3, there may be seen a pictorial representation of the opposite side of hub 46 and arm 20 depicted in FIG. 2, including the tube 30 extending outwardly toward the wall of the borehole 4, the eye bolt 60, and the spring 62 which urges the arm 20 against the wall of the borehole 4. There may also be seen the axle 84 which rotatably supports the hub 46 and arm 20 in the instrument 2, and a cam 86 having a shape related to the sine of the angle between the arm 20 and the axis of the instrument 2.

It should be apparent that the radius of the borehole 4, as defined by arm 20, may be expressed as follows:

$$R_{20} = L_{20} \sin \alpha_{20}$$

where $R_{20}$ is the perpendicular distance between the tip 38 of arm 20 to the instrument 2 axis, $L_{20}$ is the length of arm 20, and $\alpha_{20}$ is the angle between arm 20 and the instrument 2 axis. Thus, the radii as measured by arms 22 and 24, which may presumed to be at least slightly different in the average situation, may be expressed as follows:

$$R_{22} = L_{22} \sine \alpha_{22}$$
$$R_{24} = L_{24} \sine \alpha_{24}$$

Of course, the lengths of arms 20, 22 and 24 will always be equal and constant, except when the instrument 2 is moved backward and they become momentarily compressed and flipped over. Therefore, arm length will be a constant, and it is only necessary to obtain the average of the sums of the sines of the angles defined by arms 20, 22, and 24 to obtain the average radius of the borehole 4 at any depth. In the present invention, this is preferably provided by means of a potentiometer 82 which is positioned by means of a push rod 80 having a pointed end which bears on cam 86. Accordingly, as arm 20 courses up (or down) the wall of the borehole 4, cam 86 rotates back and forth to cause rod 80 to position potentiometer 82 in a manner proportional to the sine of the angle between arm 20 and the axis of instrument 2, rather than merely proportional to the angle itself. The same cam and push rod arrangement is provided for arms 22–24, and since arms 20, 22, and 24 operate independently of each other, the currents provided by their respective potentiometers may be expected to differ at least slightly, except on rare occasions when the borehole 4 may be quite round. However, the three voltages provided by arms 20, 22, and 24 may be passed to the surface processing equipment 12 to be averaged by any conventional means to provide the average radius of the borehole 4, and this average radius may either be used to correct the logging signal also provided by the instrument 2, or it may be graphically displayed in a conventional manner by the recorder 14.

As hereinafter stated, if cam 86 is shaped so as to position potentiometer 82 according to the sine of the angle between arm 20 and the axis of the instrument 2, the current developed by the potentiometer 82 will be proportional to the radius of the circle defined by arm 20. On the other hand, it may be desirable to develop a measurement of some other geometric parameter of the borehole. For example, if a modified cam is shaped so as to position potentiometer 82 according to the square of the sine of the aforementioned angle, the current flow developed by potentiometer 82 will be directly proportional to the area of the circle defined by arm 20, and the present invention will therefore provide a log of the average cross sectional area of the borehole 4.

Numerous other variations and modifications may obviously be made in the sructures and techniques herein described without departing from the basic concept of the present invention. Accordingly, it should be clearly understood that the forms of the invention described herein and shown in the figures of the accompanying drawings are illustrative only, and are not intended to limit the scope of the invention.

What is claimed is:

1. In a well logging system including a subsurface logging instrument, improved caliper apparatus comprising
    centralizing means for centering said instrument in a borehole,
    caliper means for simultaneously and separately deriving the perpendicular distances between the axis of said instrument and a plurality of points on the wall of said borehole, said caliper means including a plurality of caliper arms rotatably mounted in said instrument and extending outwardly into engagement with the wall of said borehole, said arms being rotatable through an angle exceeding 90° with respect to said logging instrument axis whereby said instrument is operable when run either upwardly or downwardly in said borehole, and
    electrical means for deriving the average of said distances between said points and said axis of said instrument.

2. In a well logging system having a subsurface instrument adapted to be passed through an uncased borehole, improved caliper apparatus comprising:
    centralizing means for centering said instrument in said borehole;
    caliper means for simultaneously and separately deriving a plurality of currents respectively representing the perpendicular distances between the axis of said instrument and the corresponding plurality of points on the wall of said borehole, said caliper means including
        a plurality of caliper arms of equal maximum length and each pivotally mounted in said instrument for rotation through a 180° angle relative to said instrument axis,
        spring means for constantly urging the free ends of said caliper arms rotatably outwardly of said instrument and against said borehole wall, and
        a plurality of electrical means for separately and simultaneously deriving a current functionally related to the sine of the angle of rotation of each of said caliper arms; and,
    electrical means for deriving and recording the average of said currents.

3. The improved caliper apparatus described in claim 2, wherein said electrical means includes,
    a plurality of cam means each having a shape related to the sine function of an angle and each mounted to rotate in conjunction with the pivotal rotation of one of said caliper arms independently of the rotation of the other of said caliper arms, and
    a plurality of potentiometers each actuated by one of said cam means for deriving a current which is proportional to the sine of the angle of rotation of the corresponding caliper arm and the axis of said instrument.

4. The improved caliper apparatus described in claim 3, wherein said caliper arms are each comprised of
    a hub means rotatably supported along the axis of said instrument and having a first aperture of a first diameter extending partially into said hub means and a second aperture of a second smaller diameter extending and connecting to said first aperture,
    a hollow tube means slidably and partially disposed in said second aperture in said hub means and having a generally flared end disposed in said first aperture,
    a piston means slidably and partially disposed in said tube means for engagement with the wall of said borehole,
    coil spring means disposed about said piston means and tube means and mounted adjacent said hub means for urging said piston means outwardly of said tube means and said hub means,
    ball means slidably disposed in said first aperture in said hub means and having a diameter larger than the diameter of said second aperture, and
    flexible linking means interconnecting said ball means and said piston means for keeping said piston means at least partially disposed within said tube means.

5. The improved caliper apparatus described in claim 4, wherein said instrument includes a hollow housing having a plurality of first slot-like apertures each for accommodating one of said caliper arms and each greater in length than twice the maximum length of each of said arms, and also having a similar plurality of second slot-like shorter apertures each located on the opposite side of said housing from one of said first slot-like apertures.

6. A method of determining the cross-sectional area of an uncased borehole in the earth, said method comprising the steps of
    establishing substantially the longitudinal axis of said borehole,
    separately and simultaneously deriving a signal proportional to the square of the perpendicular distance between said borehole axis and each of a plurality of location points on said borehole wall, and determining the average of said derived signals.

7. In a well logging system including a subsurface logging instrument, improved apparatus for determining the cross-sectional area of an uncased borehole comprising
centralizing means for centering said instrument in said borehole,
measuring means for simultaneously and separately deriving a signal proportional to the square of the perpendicular distance between the axis of said instrument and each of a plurality of points on the wall of said borehole, and means for deriving the average of said separate signals.

8. In a well logging system including a subsurface logging instrument, improved caliper apparatus for determining the cross-sectional area of an uncased borehole comprising:
centralizing means for centering said instrument in a borehole,
caliper means including a plurality of rotatable, operably connected caliper arms and cams for simultaneously and separately deriving a signal proportional to the square of the perpendicular distance between the axis of said instrument and a plurality of points contacted by said caliper arms on the wall of said borehole, and electrical means averaging said signals and having an output that is the instantaneous average cross-sectional area of said borehole.

References Cited

UNITED STATES PATENTS

| | | | |
|---|---|---|---|
| 2,622,334 | 12/1952 | Wiley | 33—178 |
| 2,649,786 | 8/1953 | Goble | 33—178 |
| 2,716,340 | 8/1955 | Nance et al. | 33—178 X |
| 2,946,130 | 7/1960 | Groner et al. | 33—178 |
| 3,060,588 | 10/1962 | Lanmon et al. | 33—178 |
| 3,075,292 | 1/1963 | Berry et al. | 33—178 |

SAMUEL S. MATTHEWS, *Primary Examiner.*